(12) United States Patent
Mantor et al.

(10) Patent No.: US 8,468,191 B2
(45) Date of Patent: Jun. 18, 2013

(54) METHOD AND SYSTEM FOR MULTI-PRECISION COMPUTATION

(75) Inventors: Michael J. Mantor, Orlando, FL (US); Jeffrey T. Brady, Orlando, FL (US); Daniel B. Clifton, Chuluota, FL (US); Christopher Spencer, Oviedo, FL (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 453 days.

(21) Appl. No.: 12/813,074

(22) Filed: Jun. 10, 2010

(65) Prior Publication Data

US 2011/0055308 A1 Mar. 3, 2011

Related U.S. Application Data

(60) Provisional application No. 61/239,347, filed on Sep. 2, 2009.

(51) Int. Cl.
*G06F 7/48* (2006.01)
(52) U.S. Cl.
USPC .......................................................... 708/513
(58) Field of Classification Search
None
See application file for complete search history.

(56) References Cited

U.S. PATENT DOCUMENTS

| | | | |
|---|---|---|---|
| 6,049,865 A * | 4/2000 | Smith | 712/222 |
| 8,037,119 B1 * | 10/2011 | Oberman et al. | 708/503 |
| 8,051,123 B1 * | 11/2011 | Oberman et al. | 708/501 |
| 2003/0126174 A1 * | 7/2003 | Kawata | 708/501 |
| 2004/0199561 A1 * | 10/2004 | Brooks et al. | 708/501 |
| 2008/0183791 A1 * | 7/2008 | Ho et al. | 708/501 |
| 2011/0055308 A1 * | 3/2011 | Mantor et al. | 708/523 |

* cited by examiner

*Primary Examiner* — David H Malzahn
(74) *Attorney, Agent, or Firm* — Sterne, Kessler, Goldstein & Fox P.L.L.C.

(57) ABSTRACT

Systems and methods for multi-precision computation are disclosed. One embodiment of the present invention includes a plurality of multiply-add units (MADDs) configured to perform one or more single precision operations and an arrangement generator to generate one or more mantissa arrangements using a plurality of double precision numbers. Each MADD is configured to receive and load said mantissa arrangements from the arrangement generator. The MADDs compute a result of a multi-precision computation using the mantissa arrangements. In an embodiment, the MADDs are configured to simultaneously perform operations that include, single precision operations, double-precision additions and double-precision multiply and additions.

14 Claims, 11 Drawing Sheets

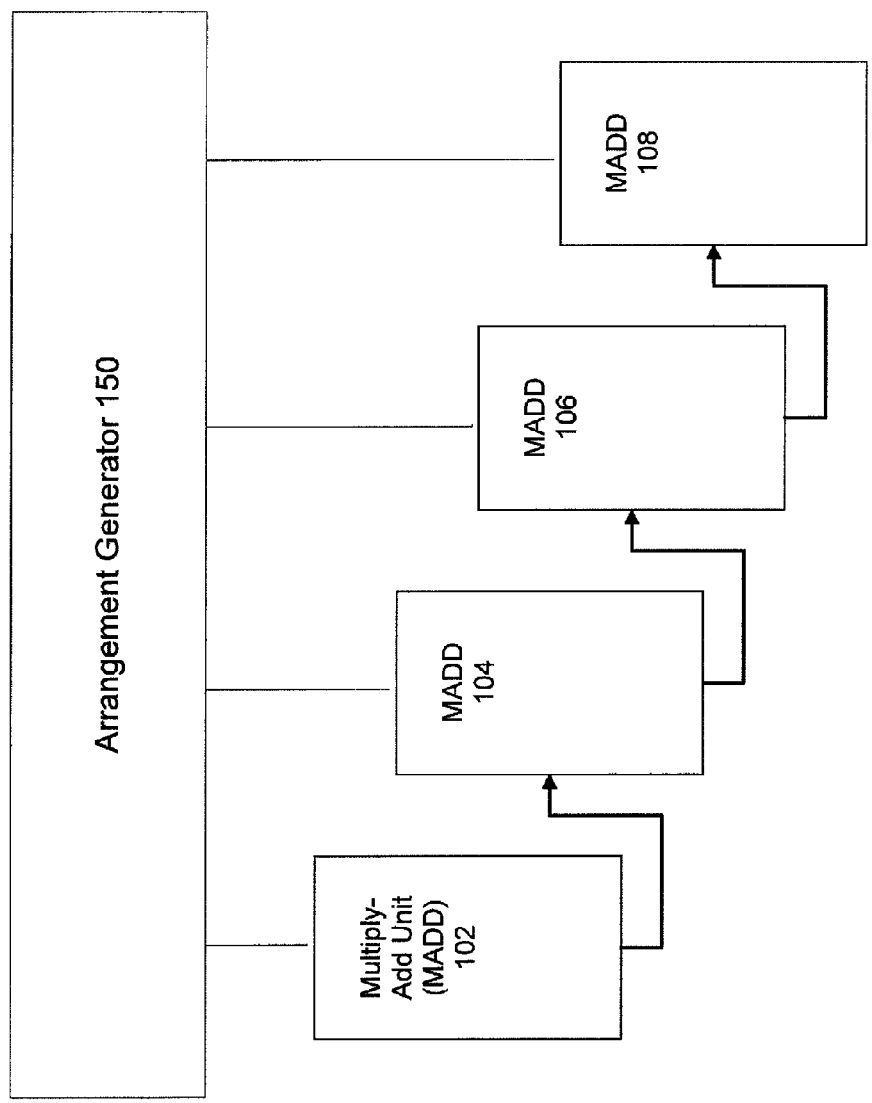

| S | EXP | MANTISSA |
|---|-----|----------|
| 31 | 30   23 | 22   0 |

Normal value = $(-1)^S * 2^{(EXP-127)} * 1.MANTISSA$

| Special Cases | S | EXP | MANTISSA |
|---|---|---|---|
| +0 | 0 | 0 | 0 |
| -0 | 1 | 0 | 0 |
| +INF | 0 | FF | 0 |
| -INF | 1 | FF | 0 |
| +Denorm | 0 | 0 | Non-zero |
| -Denorm | 1 | 0 | Non-zero |
| QNaN | X | FF | Non-zero, MSB=1 |
| SNaN | X | FF | Non-zero, MSB=0 |

FIG. 1B

| S | EXP | MANTISSA |
|---|---|---|
| 63 | 62  52 | 51  0 |

Normal value = $(-1)^S * 2^{(EXP-1023)} * 1.MANTISSA$

120

| Special Cases | S | EXP | MANTISSA |
|---|---|---|---|
| +0 | 0 | 0 | 0 |
| -0 | 1 | 0 | 0 |
| +INF | 0 | 7FF | 0 |
| -INF | 1 | 7FF | 0 |
| +Denorm | 0 | 0 | Non-zero |
| -Denorm | 1 | 0 | Non-zero |
| QNaN | X | 7FF | Non-zero, MSB=1 |
| SNaN | X | 7FF | Non-zero, MSB=0 |

FIG. 1C

METHOD AND SYSTEM FOR MULTI-PRECISION COMPUTATION

CROSS REFERENCE TO RELATED APPLICATIONS

This patent application claims the benefit of U.S. Provisional Patent Application No. 61/239,347, filed Sep. 2, 2009, entitled "Method and System for Multi-Precision Computation," which is incorporated herein by reference in its entirety.

BACKGROUND

1. Field of the Invention

The present invention relates generally to multi-precision computation in graphics processing units.

2. Background Art

More and more, graphics processing units (GPUs) are being used to perform general compute operations (such as, for example, physics simulations). These general compute operations increasingly involve double-precision computations. Conventional GPUs, however, are usually configured to perform operations on graphics data—which typically involves only single-precision computations, and not double-precision computations.

Double-precision computations are conventionally performed by a single operating block specially designed for double-precision computations. Unfortunately, such an operating block cannot efficiently perform operations on graphics data.

What are needed, therefore, are methods and systems that facilitate the performance of general compute operations by GPUs. More specifically, what are needed are systems and methods that enable GPUs to perform double-precision computations using single precision multiply-add units.

BRIEF SUMMARY

Systems and methods for multi-precision computation are disclosed. A system embodiment of the present invention includes a plurality of multiply-add units (MADDs) configured to perform one or more single precision operations, and an arrangement generator to generate one or more mantissa arrangements using a plurality of double precision numbers. Each MADD is configured to receive and load said mantissa arrangements from the arrangement generator at a clock signal.

A method embodiment of the present invention includes determining a plurality of mantissa arrangements of at least two double precision numbers, loading said mantissa arrangements into one or more single precision multiply-add units (MADDs), and computing a result of a double precision operation using said single precision MADDs.

In this way, embodiments of the present invention enable GPUs to efficiently handle double-precision computations.

Further embodiments, features, and advantages of the present invention, as well as the structure and operation of the various embodiments of the present invention, are described in detail below with reference to the accompanying drawings.

BRIEF DESCRIPTION OF THE DRAWINGS

The accompanying drawings, which are incorporated in and constitute part of the specification, illustrate embodiments of the invention and, together with the general description given above and the detailed description of the embodiment given below, serve to explain the principles of the present invention. In the drawings:

FIG. 1A illustrates a computing system in accordance with an embodiment of the present invention.

FIG. 1B is a diagram illustrating an exemplary mantissa for 32 bit operations, according to an embodiment of the invention.

FIG. 1C is a diagram illustrating an exemplary mantissa for 64 bit operations, according to an embodiment of the invention.

DETAILED DESCRIPTION

Figure 2:
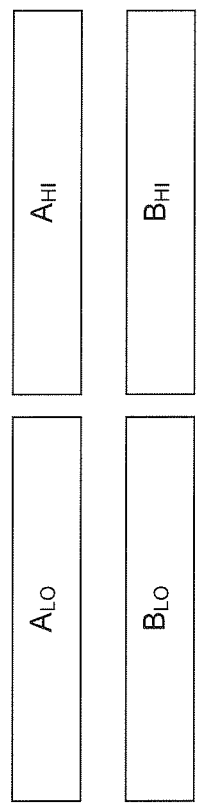
FIG. 2 illustrates respective high and low order bits of exemplary mantissas A and B, according to an embodiment of the invention.

Embodiments of the present invention enable one or more multi-precision (e.g. double precision) operations to be performed using single precision MADDs. While the present invention is described herein with illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

Embodiments of the present invention may be used in any computer system, computing device, entertainment system, media system, game systems, communication device, personal digital assistant, or any system using one or more processors.

Embodiments of the present invention, for example, may be used in processing systems having multi-core CPUs, GPUs, and/or GPGPUs, because code developed for one type of processor may be deployed on another type of processor with little or no additional effort. For example, code developed for execution on a GPU, also known as GPU kernels, can be deployed to be executed on a CPU, using embodiments of the present invention.

System

An exemplary system 100 for multi-precision computation is illustrated in FIG. 1A. The exemplary system 100 can easily be incorporated into the design of a conventional GPU to enable the GPU to perfoim double precision computations. In FIG. 1A, system 100 includes a plurality of MADDs (Multiply-Add units) and arrangement generator 150. Although FIG. 1A illustrates four MADDs, it is to be appreciated that this is for the purposes of illustration and not limitation. Embodiments of the invention can be used to operate with any number of MADDs.

MADD units 102, 104, 106 and 108 are configured to perform single precision computations. MADD units are well known to those skilled in the art. As a purely illustrative example, not intended to limit the invention, MADD units 102, 104, 106 and 108 can include a multiplier implemented in combinational logic followed by an adder. The output of each MADD is stored in a register.

Also, as shown in FIG. 1A, the output from MADD 102 is sent to MADD 104, the output from MADD 104 is sent to MADD 106, and the output from MADD 106 is sent to MADD 108. Each MADD 102, 104, 106 and 108 is configured to perform a single-precision multiply and an add operation. MADD units 102, 104, 106 and 108 can together perform operations that include, but are not limited to, four single precision operations, two double precision adds and one double precision multiply and add operation.

Additionally, MADD units 102, 104, 106 and 108 can perform single and double precision fused multiply-add, denorms, and multiply-adds. By way of example, a fused multiply-add (FMA) is a floating-point multiply-add operation performed in one step, with a single rounding operation.

Arrangement generator 150 receives a plurality of double precision numbers and generates a plurality of mantissa arrangements using the double precision numbers. An arrangement, for example, can be any combination of bits (or bytes) of number or any combination of bits (or bytes) of a plurality of numbers. As an example, arrangement generator 150 can generate a plurality of mantissa arrangements using high and low bits of a mantissa in a double precision number. The operation of arrangement generator 150 is described in detail further below.

Double Precision Multiplication

MADDs 102, 104, 106, 108 and arrangement generator 150 can be configured to perform double precision multiplication. As an example, an input to a double-precision multiply operation comprises two double-precision numbers, which will be referred to herein as A and B. As is well known, being double precision numbers, A and B each include 64 bits: 1 sign bit, 11 exponent bits, and 52 mantissa bits.

FIG. 1B illustrates an exemplary mantissa for 32 bit operations and FIG. 1C illustrates an exemplary mantissa for 64 bit operations. As illustrated in FIGS. 1B and 1C, a mantissa value can be associated with a sign bit and a plurality of exponent bits. Tables 110 and 120 illustrated in FIGS. 1B and 1C respectively, illustrate exemplary values of sign and exponential bits for a plurality of mantissa and exponent scenarios.

In order to be input into MADDs 102, 104, 106 and 108, the 52 mantissa bits of both A and B are split into a low portion and a high portion by arrangement generator 150.

After splitting A and B into high and low portions (e.g. 26 bits each for a 52 bit mantissa), the multiplication of A and B, for example, can be represented mathematically in the following manner:

$$A*B = (A_{LO} + A_{HI})*(B_{LO} + B_{HI}) = A_{LO}*B_{LO} + A_{LO}*B_{HI} + A_{HI}*B_{LO} + A_{HI}*B_{HI}$$

FIG. 2 illustrates respective high and low order bits of exemplary mantissas A and B, according to an embodiment of the invention. As shown in FIG. 2, mantissa bits for A are divided into $A_{HI}$ and $A_{LO}$. Additionally, mantissa bits for B are divided into $B_{HI}$ and $B_{LO}$. As described earlier, $A_{HI}$ and $A_{LO}$ can include 26 bits each Also, for example, $B_{HI}$ and $B_{LO}$ can include 26 bits each.

Figure 3:
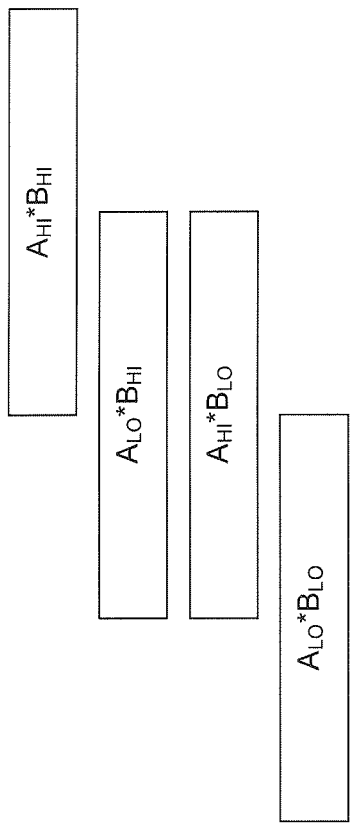
FIG. 3 illustrates a plurality of mantissa arrangements, according to an embodiment of the invention.

FIG. 3 illustrates an exemplary pictorial representation of the partial products on the right-hand side of the above equation. FIG. 3 includes a first partial product, $A_{LO}*B_{LO}$, a second partial product, $A_{HI}*B_{LO}$, a third partial product, $A_{LO}*B_{HI}$, and a fourth partial product, $A_{HI}*B_{HI}$. FIG. 3 also illustrates the portion of these partial products that overlap.

Figure 4A:
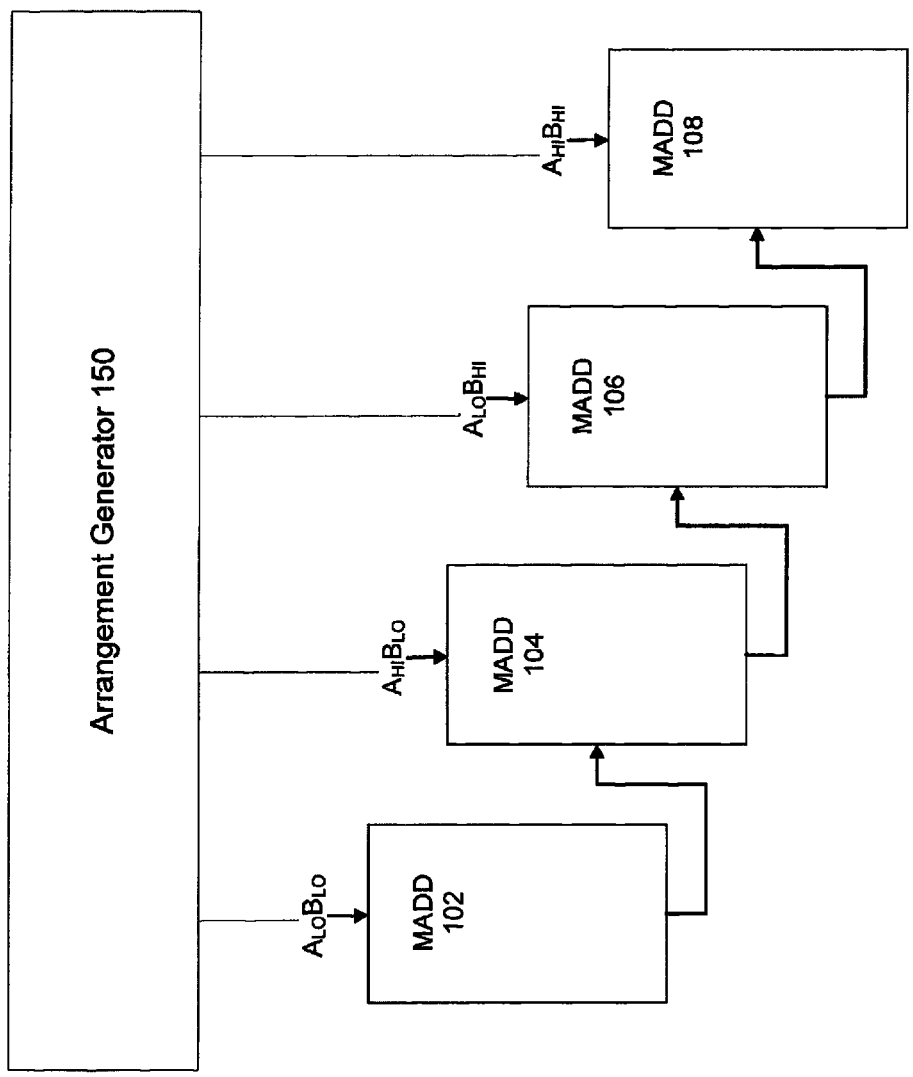
FIG. 4A illustrates loading of a plurality of mantissa arrangements into multiply add units (MADDs), according to an embodiment of the invention.

To perform a double-precision multiply operation, portions of A and B (or the partial products) are loaded into MADDs 102, 104, 106 and 108. This loading operation is illustrated in FIG. 4A and is performed by arrangement generator 150. Furthermore, the MADDs receive their inputs in a manner that are staggered in time from arrangement generator 150. The loading of partial products by arrangement generator 150 is described in greater detail below.

On a first clock cycle, $A_{LO}$ and $B_{LO}$ are loaded into MADD 102. MADD 102 performs a single-precision multiply operation on $A_{LO}$ and $B_{LO}$ and sends the result to MADD 104.

On a second clock cycle, $A_{HI}$ and $B_{LO}$ are loaded into MADD 104. MADD 104 performs a single-precision multiply operation on $A_{HI}$ and $B_{LO}$ and adds the portion of the partial product of $A_{HI}*B_{LO}$ that overlaps with the partial product of $A_{LO}*B_{LO}$ (which was received from MADD 102). The result of MADD 104's multiply and add is then sent to MADD 106.

On a third clock cycle, $A_{LO}$ and $B_{HI}$ are loaded into MADD 106. MADD 106 performs a single-precision multiply operation on $A_{LO}$ and $B_{HI}$ and adds the partial product of $A_{LO}*B_{HI}$ to the result received from MADD 104. The result of MADD 106's multiply and add is then sent to MADD 108.

On a fourth clock cycle, $A_{HI}$ and $B_{HI}$ are loaded into MADD 108. MADD 108 performs a single-precision multiply operation on $A_{HI}$ and $B_{HI}$ and adds the partial product of $A_{HI}*B_{HI}$ to the result received from MADD 106. The result of MADD 108's multiply and add is a double-precision multiply result of A and B.

In this manner, the present invention facilitates double precision multiplication using a plurality of MADDs that are configured to perform single precision operations.

Figure 4B:
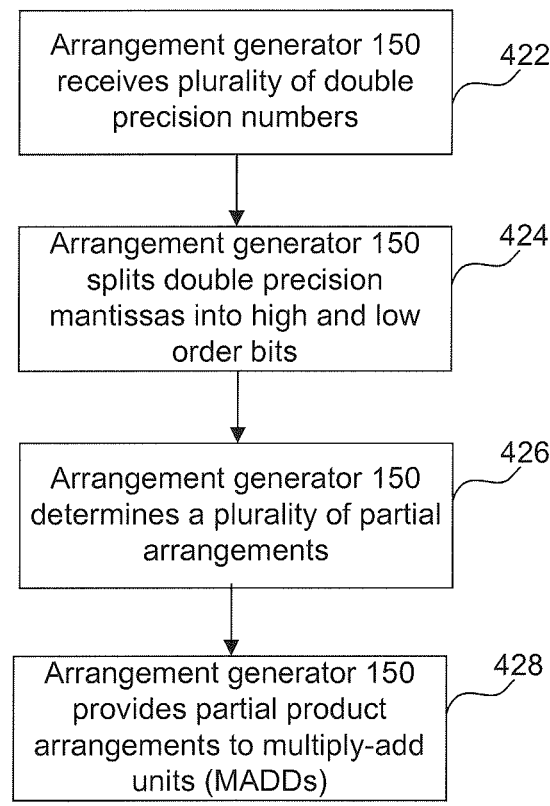
FIG. 4B is a flowchart illustrating an exemplary operation of an arrangement generator, according to an embodiment of the invention.

FIG. 4B is flowchart 420 illustrating an exemplary overall operation of arrangement generator 150, according to the present invention.

In step 422, arrangement generator 150 receives a plurality of double precision numbers as input. As an example, arrangement generator 150 can receive double precision numbers A and B described above.

In step 424, arrangement generator 150 splits the double precision numbers received in step 422 into respective high and low order bits. For example, as described above, double precision numbers A and B are split into $A_{HI}$-$A_{LO}$ and $B_{HI}$-$B_{LO}$ respectively.

In step 426, arrangement generator 150 determines a plurality of partial product arrangements using the output of step 424. For example, arrangement generator 150 determines a first partial product arrangement, $A_{LO}*B_{LO}$, a second partial product arrangement, $A_{HI}*B_{LO}$, a third partial product arrangement, $A_{LO}*B_{HI}$, and a fourth partial product arrangement, $A_{HI}*B_{HI}$.

In step 428, arrangement generator 150 provides the partial product arrangements determined in step 426 to MADDs 102, 104, 106 and 108, respectively.

MADDs 102, 104, 106 and 108 then perform single precision multiplication on each partial product arrangement and determine a result of the double precision multiplication operation.

Exemplary MADD Pipeline

Figure 5A:
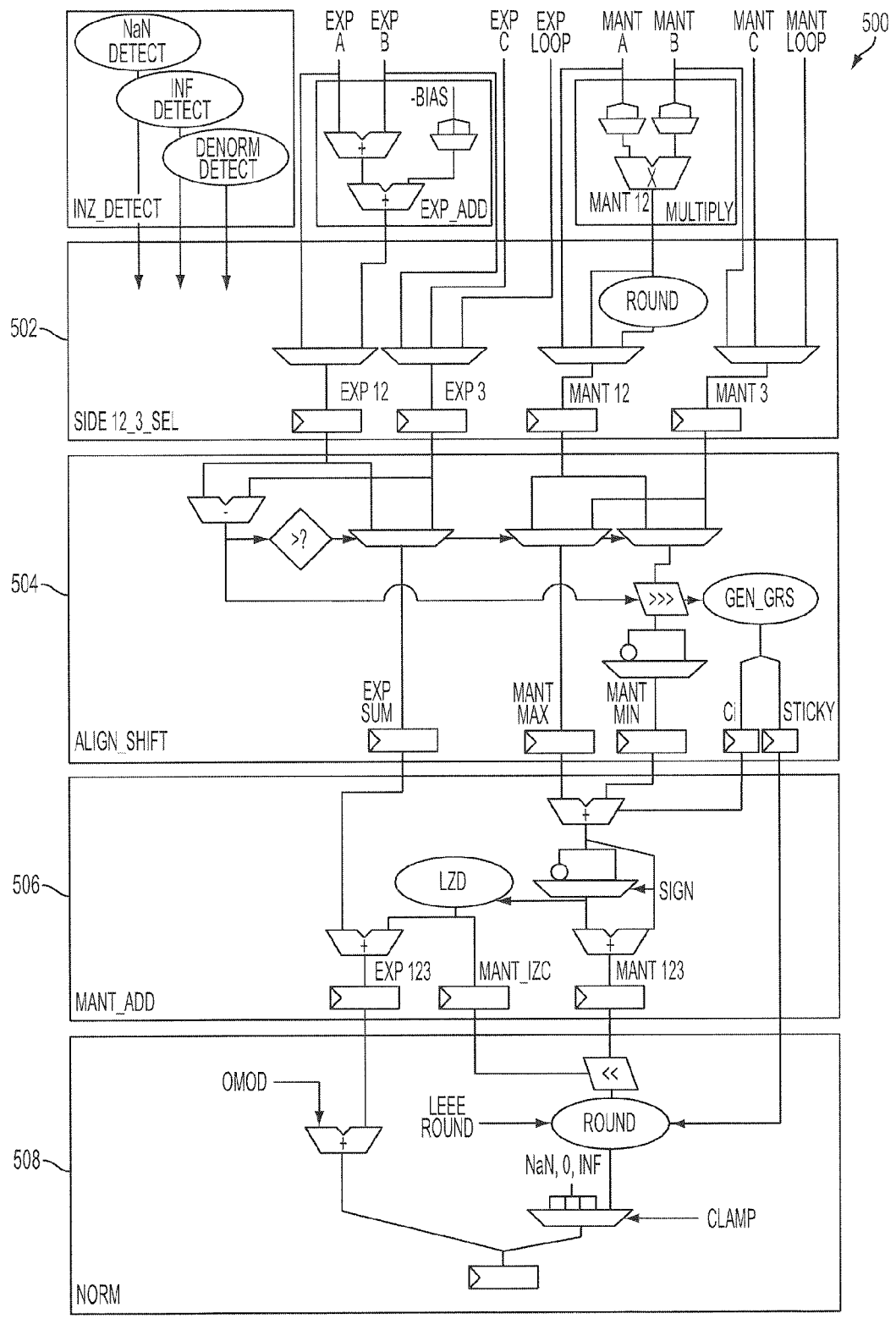
FIG. 5A illustrates an exemplary MADD pipeline than can be configured to simultaneously perform a plurality of multi-precision computations, according to an embodiment of the invention.

FIG. 5A illustrates an exemplary MADD pipeline 500 constructed and arranged in accordance with the present invention. MADD pipeline 500 is configured to simultaneously perform operations that include, single precision operations, double-precision adds and double-precision multiply and add operations. In addition, as described earlier, embodiments of the present invention can perforin single and double precision fused multiply-add, de-norms, and multiply-adds.

As shown in FIG. 5A, MADD pipeline 500 includes pipe 502 for decoding an opcode associated with an operation to be performed. The pipe 502 also performs mantissa multiplication and any exponential mathematical operations associated with double precision numbers A, B or C. Pipe 504 is configured to perform mantissa alignment, sign and exponent selection. Pipe 506 is configured to perform mantissa addition, rough normalization and exponential adjustments. Pipe 508 is configured to perforin final normalization, rounding and clamping associated with a double precision operation.

Figure 5B:
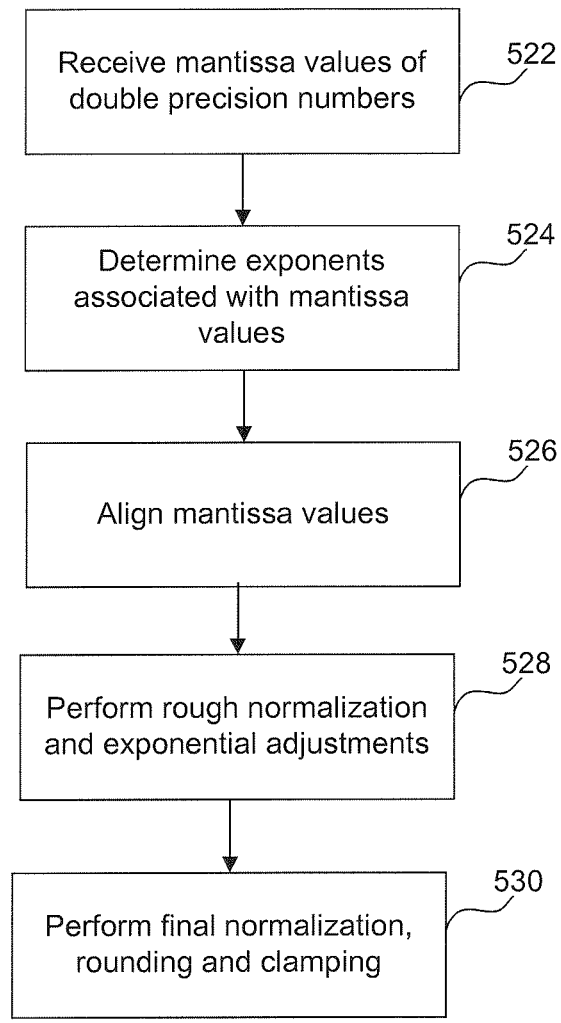
FIG. 5B is a flowchart illustrating an exemplary operation of a MADD pipeline, according to an embodiment of the invention.

FIG. 5B is flowchart 520 illustrating an exemplary overall operation of pipeline 500, illustrated in FIG. 5A.

In step 522, mantissa values of double precision numbers A and B are received at pipe 504.

In step 524, exponents associated with the mantissa values of double precision numbers A and B are determined.

In step 526, the mantissa values are aligned (e.g. aligned in a manner illustrated in FIG. 3) and associated with the correct sign bit.

In step 528, now that the mantissas are aligned, pipe 506 performs mantissa addition, rough normalization and exponential adjustments.

In step 530, pipe 508 performs final normalization, rounding and clamping associated with a double precision operation.

Figure 6:
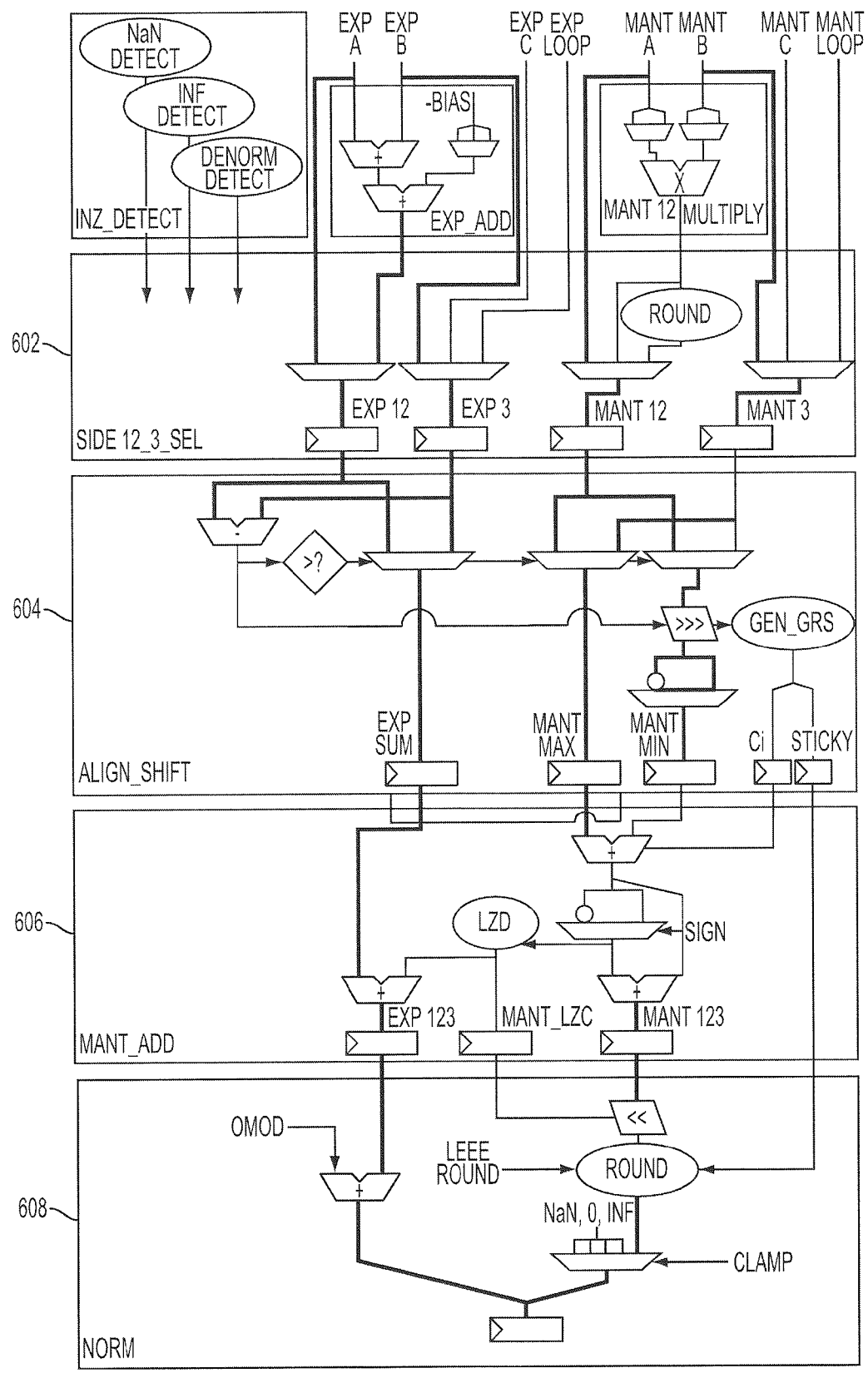
FIG. 6 illustrates an exemplary MADD pipeline configured to perfoim double precision multiplication, according to an embodiment of the present invention.

FIG. 6 illustrates exemplary connections and flow of communication between modules illustrated in FIG. 5A to accomplish double precision multiplication in accordance with the present invention.

In pipe 602, mantissa values of double precision numbers A and B are multiplied in the 'multiply' unit according to the embodiments of the invention described above. Exponents associated with mantissa values of double precision numbers A and B are also added in the 'exp add' unit.

In pipe 604, the mantissa values of double precision numbers A and B are aligned (e.g. aligned in a manner illustrated in FIG. 3) and associated with the correct sign bit. Now that the mantissas are aligned, pipe 606 performs mantissa addition, rough normalization and exponential adjustments.

Pipe 608 receives input from pipe 606 and performs final normalization, rounding and clamping associated with the double precision multiplication operation.

Figure 7:
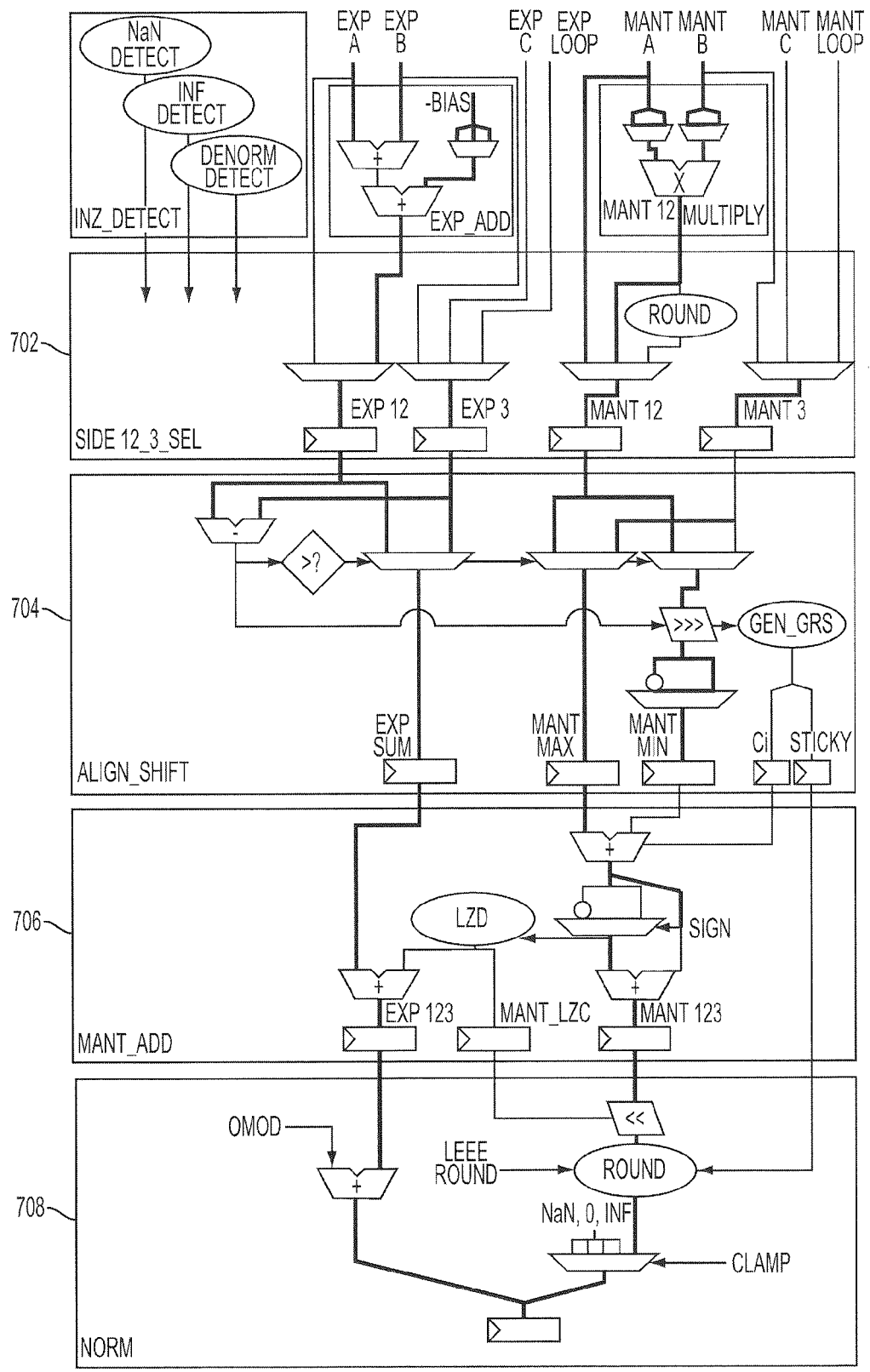
FIG. 7 illustrates an exemplary MADD pipeline configured to perform double precision addition, according to an embodiment of the present invention.

As described earlier, embodiments of the invention can also be configured to perform double precision addition. FIG. 7 is a block diagram illustration of exemplary connections and flow of communication between modules illustrated in FIG. 5 to accomplish double precision addition.

In pipe 702, mantissa values of double precision numbers A and B are received and provided to pipe 704. Exponents associated with the mantissa values of double precision numbers A and B are also received and are provided to pipe 704.

In pipe 704, the mantissa values are aligned (e.g. aligned in a manner illustrated in FIG. 3) and associated with the correct sign bit. After the mantissas are properly aligned, pipe 706 performs mantissa addition, rough normalize, and exponential adjustments.

Pipe 708 receives input from pipe 706 and performs final normalization, rounding and clamping associated with a double precision operation.

In this manner, embodiments of the invention can also be configured to perform double precision addition.

Conclusion

The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A method for performing a multi-precision operation in a GPU, comprising:

determining a plurality of arrangements using mantissa bits of at least two double precision numbers, wherein the mantissa bits of the at least two double precision numbers are split into respective first and second portions, and wherein the plurality of arrangements are composed using the respective first and second portions;

loading said arrangements into one or more single precision multiply-add units (MADDs), respectively; and performing a plurality of single precision operations in accordance with the loading to produce a result, the single precision operations being representative of one or more multi-precision operations.

2. The method of claim 1, wherein the determining a plurality of arrangements comprises:

determining said plurality of arrangements using high and low order mantissa bits of said double precision numbers.

3. The method of claim 1, wherein the loading said arrangements comprises:

loading said arrangements into said MADDs at each clock cycle of a plurality of clock cycles.

4. The method of claim 1, further comprising performing at least one of normalizing said result, rounding said result, and clamping said result.

5. A method for performing a double precision multiply operation, comprising:

determining a plurality of partial product arrangements using respective mantissa bits of at least two double precision numbers, wherein the mantissa bits of the at least two double precision numbers are split into respective first and second portions, and wherein the plurality of partial product arrangements are composed using the respective first and second portions;

loading said partial product arrangements into one or more multiply-accumulators (MADDs) on each clock cycle of a plurality of clock cycles, respectively;

computing partial products at said one or more MADDs, using single precision multiplication, between said clock cycles after said loading;

determining an overlap between a first partial product at a first MADD of the one or more MADDs and a second partial product at a second MADD of the one or more MADDs that receives said first partial product from said first MADD;

adding a portion of said second partial product, at said second MADD, that overlaps with said first partial product received from said first MADD to generate a first result; and providing said first result to a third MADD of the one or more MADDs.

6. The method of claim 5, further comprising:

adding said first result with a third partial product computed at said third MADD in the computing to generate a second result; and providing said second result to a fourth MADD of the one or more MADDs.

7. The method of claim 6, further comprising:

adding said second result with a fourth partial product computed in the computing, at said fourth MADD, to generate a final result of said double precision multiply operation.

8. The method of claim 7, further comprising:

normalizing said final result;

rounding said final result; and clamping said final result.

9. The method of claim 5, further comprising:

decoding an opcode associated with said multiply operation;

determining signs of said double precision numbers; and determining exponents associated with said double precision numbers.

10. The method of claim 5, wherein the determining a plurality of partial product arrangements comprises:

composing said partial product arrangements using a respective high group of the mantissa bits and a low group of the mantissa bits of said double precision numbers.

11. A method for performing a double precision addition operation, comprising:

determining a plurality of arrangements using mantissa bits of at least two double precision numbers, wherein the mantissa bits of the at least two double precision numbers are split into respective first and second portions, and wherein the plurality of arrangements are composed using the respective first and second portions;

loading said arrangements into one or more single precision multiply-add units (MADDs);

aligning said arrangements; and computing a result of said double precision addition operation by adding said aligned arrangements.

12. The method of claim 11, wherein said aligning comprises:

determining an overlap of said arrangements.

13. The method of claim 11, further comprising:

normalizing said result;

rounding said result; and clamping said result.

14. A system for performing double precision operations, comprising:

a plurality of multiply-accumulators (MADDs) configured to perform one or more single precision operations; and an arrangement generator configured to generate one or more mantissa arrangements using a plurality of double precision numbers, wherein said arrangement generator is configured to split mantissa bits of each said double precision number into respective first and second portions and to compose said mantissa arrangements using the respective first and the second portions, wherein each said MADD is configured to receive and load said mantissa arrangements from said mantissa arrangement generator.

* * * * *